United States Patent [19]

Engel

[11] 4,163,368
[45] Aug. 7, 1979

[54] CENTRIFUGAL REPLENISHING PUMP FOR A HYDROSTATIC PUMP MOTOR SYSTEM

[75] Inventor: William K. Engel, Peoria, Ill.

[73] Assignee: Caterpillar Tractor Co., Peoria, Ill.

[21] Appl. No.: 798,953

[22] Filed: May 20, 1977

[51] Int. Cl.² .............................................. F16D 31/02
[52] U.S. Cl. .................................................. 60/488
[58] Field of Search ............... 91/491, 492; 417/203; 60/464, 485, 487, 488

[56] References Cited

U.S. PATENT DOCUMENTS

| | | | |
|---|---|---|---|
| 2,293,692 | 8/1942 | Wylie | 417/203 |
| 2,293,693 | 8/1942 | Wylie et al. | 417/203 |
| 2,457,101 | 12/1948 | Horton | 417/203 |
| 2,506,974 | 5/1950 | Sorensen | 417/203 |
| 2,513,446 | 7/1950 | Brown | 417/203 |
| 2,620,733 | 12/1952 | Overlake | 91/491 |
| 2,936,589 | 5/1960 | Quintilian | 60/464 |
| 3,153,909 | 10/1964 | Balaban | 417/203 |
| 3,158,102 | 11/1964 | Ward | 417/203 |
| 3,521,449 | 7/1970 | Speggiorin | 60/488 |
| 3,581,498 | 6/1971 | Cudnohofsky | 60/464 |
| 3,654,761 | 4/1972 | Eukmann | 60/488 |
| 4,033,127 | 7/1977 | Amstutz | 60/464 |

*Primary Examiner*—William L. Freeh
*Attorney, Agent, or Firm*—Phillips, Moore, Weissenberger, Lempio & Majestic

[57] ABSTRACT

In a radial piston pump-radial piston motor drive system, a centrifugal replenishing pump is provided integral with the pump driving means. The radial-piston pump, radial piston motor, centrifugal replenishing pump, and most of the fluid circuit, including fluid sump are all contained within a unitary housing to provide a compact self-contained pump-motor hydrostatic unit.

5 Claims, 1 Drawing Figure

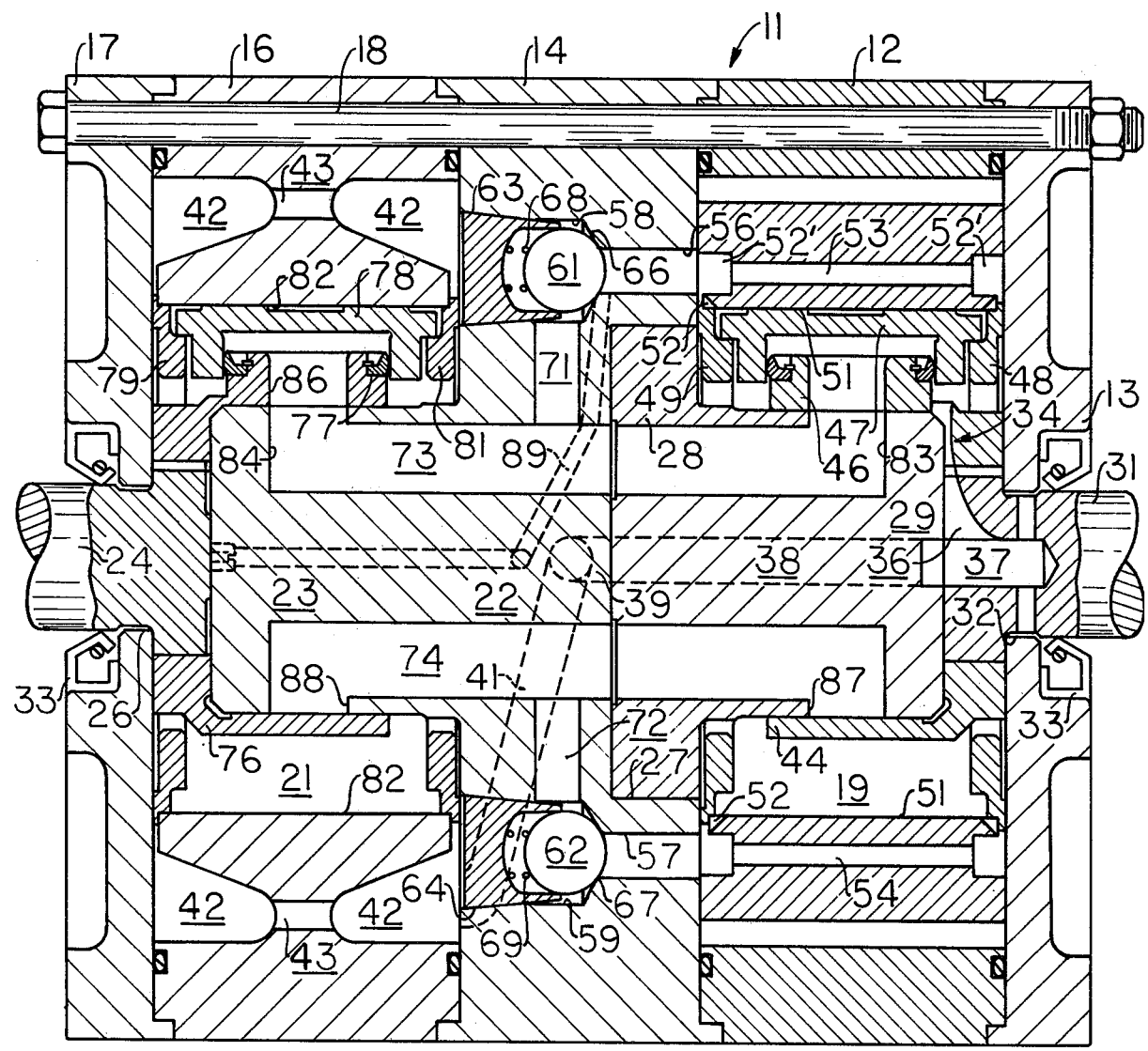

CENTRIFUGAL REPLENISHING PUMP FOR A HYDROSTATIC PUMP MOTOR SYSTEM

BACKGROUND OF THE INVENTION

Radial piston pump and radial piston motors, more commonly referred to as hydrostatic pumps and motors, are well known. Such systems utilize hydraulic fluid from the radial piston pump to drive the radial piston motor with high efficiency and flexibility. The pressures developed within such types of equipment are quite high and the necessity for constant and complete lubrication of all bearings and mating surfaces is obvious. In addition, since the system depends upon the transport of hydraulic fluid, any deficiency in the fluid supply, especially to the pump, will result in inefficient operation of the system and/or starvation of the hydraulic fluid supply from the pump to the motor.

SUMMARY OF THE INVENTION

The present invention is directed to overcoming one or more of the problems set forth above.

According to the present invention, a centrifugal impeller type charging pump is provided integrally with a radial piston pump to provide added fluid to ensure an adequate supply to the inlet of the radial piston pump. The charging pump is directly coupled to the radial piston pump within the pump housing to ensure a compact construction and to reduce the costs that would be involved in supplying make-up fluid from an external source.

Additionally, in the present invention, the radial piston pump and the integral centrifugal pump as well as the radial piston motor are all contained within a single unitary housing. The centrifugal pump also ensures a continual supply of filtered fluid and adequate lubrication of the motor.

BRIEF DESCRIPTION OF THE DRAWING

The single FIGURE of the drawing is a longitudinal cross-sectional view of a combined radial piston pump-motor unit having a centrifugal impeller pump integral therewith.

DETAILED DESCRIPTION OF THE INVENTION

Referring to the single figure of the drawing, a radial piston pump-motor unit comprises a unitary housing 11 including an annular pump housing 12 and an associated pump end plate 13; an annular spacer 14 interposed between pump housing 12 and an annular motor housing 16 with a motor end plate 17 associated therewith. All of the housing portions 12, 13, 14, 16 and 17 are securely fastened together by a plurality of bolts one of which is shown at 18.

Pump end plate 13, annular pump housing 12 and spacer 14 define a pump chamber 19; while motor end plate 17, annular motor housing 16 and spacer housing 14 define a similar motorchamber 21.

Spacer housing 14 further comprises a central portion 22 that includes an axially extending pintle shaft 23. Pintle shaft 23 extends into the central area of motor chamber 21 and abuts motor output shaft 24 that extends beyond the exterior of housing 11 through a bore 26 in motor end plate 17. Suitable bearings (not shown) extend to casing 11 as well as the connection with the rotors maintain alignment of shaft 24 and permit rotation thereof.

A recess 27 on the pump side of spacer 14 receives an enlarged base portion 28 of pump pintle shaft 29. The pintle shaft 29 extends axially into pump chamber 19 and abuts pump input shaft 31. Input shaft 31 extends exteriorly of housing 11 through a bore 32 in pump end plate 13.

Seals 33 surround both input and output shafts and prevent leakage of hydraulic fluid from housing 11 through the shaft openings 26, 32.

The end of input shaft 31 adjacent pintle shaft 29 is formed into a plurality of centrifugal pump blades, only one of which is illustrated at 34. These pump blades extend radially from the axis of pump chamber 19 and are co-extensive with pintle shaft 29. Fluid passages 36 extend along the pump blades and communicate an axial bore 37 extending through the internal end of input shaft 31 with pump chamber 19.

Axial bore 37 communicates directly with a similar axial bore 38 extending through pump pintle shaft 29. Pump pintle shaft bore 38, in turn, communicates directly with a short axial bore 39 in motor pintle shaft 23, which, in turn, communicates with a radial bore 41 extending outwardly through the body of spacer 14 and opens directly into fluid sump chamber 42. Sump chamber 42 comprises two annuli formed within motor housing 16. Both sump annuli are in direct communication through a number of bores 43 distributed circumferentially around housing 16.

An annular pump rotor 44 is fitted on pump pintle shaft 29 and is splined onto input pump shaft 31. Pump rotor 44, in turn, comprises a plurality of radially extending pistons 46, only one of which is illustrated. Pistons 46, in turn, extend into cylinders 47, only one of which is illustrated. The heads of cylinders 47 are held, by guide rings 48, 49 in contact with an annular sliding race 51 that is retained within pump housing 12. Race 51, although circular in cross-section, may be positioned into varying degrees of eccentricity with respect to the axis of the pump and pump rotor 44. Pump housing 12 comprises two semicircular portions at the opposite ends thereof connected by a short straight portion. The circular race 51 may be variously positioned within housing 12 by hydraulic means (not shown) as desired to vary the pump hydraulic output. Such construction of pump 12 is conventional in the art and is disclosed in greater detail in U.S. Pat. No. 3,899,957 issued Aug. 19, 1975, and the disclosure therein is incorporated herein by reference.

Adjacent pump end plate 13, a series of notches 52 in the edge of race 51 permit fluid communication between pump chamber 19 and annuli 52' and a plurality of longitudinal bores 53 and 54 that pass through race 51. Bores 53, 54 are positioned in a plane passing through the axis of pump housing 12 so that they are equally spaced from one another.

Bores 53, 54 in turn, communicate with bores 56, 57, respectively, in spacer housing 14. The bores 56, 57 communicate with check valve chambers 58, 59. Valving elements 61, 62 are retained within the chambers 58, 59 by plugs 63, 64 and are urged against valve seats 66, 67 by resilient elements 68, 69 respectively.

Radial bores 71, 72 communicate check valve chambers 58, 59 to bores 73, 74 that pass longitudinally through pintle shafts 23 and 29 respectively.

An annular motor rotor 76 is fitted on motor pintle shaft 23 and is splined onto output shaft 24. Motor rotor 76, in turn, comprises a plurality of radially extending pistons 77, only one of which is illustrated. Pistons 77, in turn, extend into mating cylinders 78, only one of which is illustrated. The method of cylinders 78 are held, by guide rings 79, 81, in sliding contact with annular motor race 82, that is retained within motor housing 16.

Motor race 82, although circular, is positioned eccentrically with respect to the axis of the motor and rotor 76. Thus the fluid volumes within the piston-cylinder varies with their angular positioning around the circumference of motor rotor 76.

Bore 73, previously referred to, passes longitudinally through pintle shafts 23 and 29 and terminates at the pump end in a radially extending port 83. Port 83 has an angular opening sufficient to communicate bore 73 with any piston moving in the upper half of the pump. All of pistons 46 have central bores opening into the interior of cylinders 47. The other end of bore 73 terminates at the motor in a radially extending port 84 that is similar in configuration to port 83. Port 84 is in communication with the chambers formed within cylinders 78 through bores 86 passing through pistons 77 when said cylinders and pistons are positioned in the upper half of the motor.

Positioned diametrically opposite to bore 73 is a bore 74 that also passes through pintle shafts 23 and 29. Bore 74 terminates, at the pump end, in a radially extending port 87. Port 87 has an angular opening that is sufficient to place it into communication with any pump rotor pistons moving in the lower half of the pump. The other end of bore 74 terminates at the motor end in a radially extending port 88, that is similar in configuration to port 87. Port 88 is in communication with the chambers formed within cylinders 78 when said cylinders and associated pistons are moving in the lower half of the motor.

A passageway 89 communicates at one end to bore 57 and then passes through spacer housing 14 and its central portion 22 and continues axially through pintle shaft 23. Passageway 89 extends through the end of pintle shaft 23 and abuts the end of output shaft 24.

Externally connected to housing 11 is a combination shuttle and high pressure relief valve such as that described in the patent application entitled "Combination Shuttle and High Pressure Relief Valve" being filed concurrently herewith and having the same inventor as the present application. Such valve structure communicates with both passages 73 and 74 through ports (not shown), as well as with sump chamber 42. In addition external controls may be provided to hydraulically position race 51 within housing pump 12 in order to regulate the pumping output of the pump. The motor has its race 82 permanently positioned in eccentric relation to motor rotor 76 whereby its speed and direction are directly determined by the output of the pump.

OPERATION OF THE PUMP-MOTOR AND CENTRIFUGAL REPLENISHING PUMP

The pump and motor operate in the conventional manner of such hydrostatic systems. Specifically, the housing 11 and associated controls and valving mechanisms are filled with hydraulic fluid. Input shaft 31 is powered by an extended motor to rotate the rotor 44 and thereby rotate the pistons 46 and their associated cylinders 47. Because of the eccentricity of race 51, fluid is pumped from the appropriate cylinder-piston as rotation occurs. Depending upon the direction of rotation, fluid is pumped either into passageway 73 or 74, as the case may be. This fluid is, in turn, forced into the motor cylinders and pistons in communication with the pressurized passageway. The pressurized piston-cylinders react against motor race 82 to, in turn, force rotation of motor rotor 76 and its associated output shaft 24.

At the same time, fluid is exhausted from those motor cylinders and pistons opposite the pressurized piston-cylinders, and from thence back through either passageway 73 or 74 on the low pressure side of the system. The low pressure fluid returns to the appropriate pump cylinder-pistons and the cycle continues.

As the input shaft 31 rotates, the centrifugal pump blades 34 rotate therewith. Hydraulic fluid supplied from the sump chamber 42 through bores 41, 38 and 37 is pumped through the blades 34. The blades comprise a first stage of the centrigugal pump. Although not readily apparent in the figure, cylinders 47 are separated one from the other about the circumference of rotor 44. Thus a plurality of passages are formed between the cylinders wherein the hydraulic fluid flows after leaving blades 34. The rotating cylinders, in turn, effectively act as pump "blades" and produce a second stage to pump the fluid through annuli 52' into passageways 53 and 54 to check valves 61 and 62.

In the event that the fluid pressure returning through either passageway 73 or 74 falls below the level determined by springs 68 or 69, the respective check valve will open to admit make-up fluid into passageway 73 or 74 through passageways 71 or 72 respectively. Thus, any deficiency in the amount of fluid returning to the pump through either passageway 73 or 74 will be made up from the constantly pressurized fluid in bores 53, 54 supplied by the centrifugal pump.

Pressurized fluid from the centrifugal pump is also constantly supplied to the output shaft 24 through passageway 89 to thereby ensure complete and constant lubrication of the motor parts.

Pressurized fluid from the centrifugal pump is also continually supplied through either of two ports (not shown) to the combination shuttle and high pressure relief valve disclosed in the above-referenced co-pending application. This pressurized fluid is continually forced through the system filter and from thence back into sump chamber 42. Thus the fluid is being continuously filtered during operation of the system, and a continuous supply of hydraulic fluid is available from the sump to supply the centrifugal pump.

The centrifugal pump ensures a continual supply of high pressure fluid to make up any deficiencies in the low-pressure fluid being returned from the motor and the pump; it ensures proper and constant lubrication of the motor and pump parts; and it provides for a continual filtration of hydraulic fluid during operation.

While integration of the centrifugal pump with an hydrostatic pump in a hydrostatic pump-motor system has been described herein, it will be apparent that the invention can be more broadly applied.

Thus, for any rotary pump structure, the centrifugal pump may be integrated with the rotary components. An auxiliary component of hydraulic fluid will be thereby available for make-up fluid, bearing lubrication and similar purposes. To comply with the requirements of the present invention, it is only necessary that the pump components be modified to provide blade or vane structures integral with the pump rotor or rotors, and to provide a fluid inlet to the blades or vanes, and passageways for delivery of the pressurized fluid to the desired portion of the system. All such modifications or alternate uses of the present invention as are readily apparent are incorporated into this disclosure.

The embodiment of the invention in which an exclusive property or privilege is claimed are defined as follows:

1. In an hydrostatic pump-motor system including a housing enclosing a hydrostatic pump having rotor means with an input shaft thereto and an hydrostatic motor driven by hydraulic fluid forced from said pump, the improvement comprising:

centrifugal pump means integral with said rotor means and internally within said housing and in driven connection with said input shaft, the centrifugal pump means replenishing said pump by providing an additional source of hydraulic fluid thereto; and, a plurality of passageways within said housing which communicate a sump chamber for said system to the centrifugal pump means, which communicate outlet hydraulic fluid from the centrifugal means to fluid inlets for said hydrostatic pump, and which communicate pressurized fluid from said centrifugal pump to bearing surfaces of said hydrostatic motor.

2. The system of claim 1 wherein pressure-sensitive valves regulate the flow of hydraulic fluid through the passageways which communicate the outlet hydraulic fluid from the centrifugal pump means to fluid inlets for said hydrostatic pump, the valve means regulation responsive to pressure in the fluid inlets falling below a predetermined level.

3. The system of claim 1 wherein passageways communicate hydraulic fluid from said centrifugal pump through pump and motor and thence to a filter and from thence to the sump chamber for said system, to provide continuous filtration of hydraulic fluid within said system.

4. The system of claim 1 wherein fluid output from said centrifugal pump lubricates said hydrostatic pump.

5. The system of claim 1 wherein said centrifugal pump comprises a first stage including bladed impeller means and a second stage comprising passages defined by hydrostatic pump cylinders.

* * * * *